United States Patent
Holtstiege et al.

(10) Patent No.: US 11,663,425 B2
(45) Date of Patent: May 30, 2023

(54) VEHICLE WINDOW HAVING A TRANSPONDER

(71) Applicant: SAINT-GOBAIN GLASS FRANCE, Courbevoie (FR)

(72) Inventors: Thomas Holtstiege, Schwelm (DE); Tim Schmitz, Aachen (DE); Stefan Droste, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 10 days.

(21) Appl. No.: 17/269,475

(22) PCT Filed: Jul. 24, 2019

(86) PCT No.: PCT/EP2019/069862
§ 371 (c)(1),
(2) Date: Feb. 18, 2021

(87) PCT Pub. No.: WO2020/048677
PCT Pub. Date: Mar. 12, 2020

(65) Prior Publication Data
US 2021/0256230 A1    Aug. 19, 2021

(30) Foreign Application Priority Data

Sep. 3, 2018 (EP) ..................... 18192178

(51) Int. Cl.
*G06K 7/10* (2006.01)
*B60J 1/00* (2006.01)
*G06K 19/07* (2006.01)

(52) U.S. Cl.
CPC .......... *G06K 7/10366* (2013.01); *B60J 1/001* (2013.01); *G06K 19/0723* (2013.01)

(58) Field of Classification Search
CPC ............ G06K 7/10366; G06K 19/0723; B60J 1/001
(Continued)

(56) References Cited

U.S. PATENT DOCUMENTS 6,220,516 B1 * 4/2001 Tuttle .................. H04L 61/5046
235/492
6,275,157 B1 * 8/2001 Mays ..................... G07C 5/085
340/572.5
(Continued)

FOREIGN PATENT DOCUMENTS

CA        2577659 A1    3/2006
CN    103222112 A  *   7/2013 ........... H01Q 1/1271
(Continued)

OTHER PUBLICATIONS

International Search Report as issued International Patent Application No. PCT/EP2019/069862, dated Oct. 22, 2019.
(Continued)

*Primary Examiner* — Michael G Lee
*Assistant Examiner* — David Tardif
(74) *Attorney, Agent, or Firm* — Pillsbury Winthrop Shaw Pittman LLP

(57) ABSTRACT

A vehicle window includes a first glass pane, a transponder having an antenna and a control unit for communicating with a reader, wherein the control unit includes a memory for storing identification data. A reflector is associated with and spaced apart from the transponder for increasing an antenna gain of the antenna, wherein the reflector is implemented as a transparent, electrically conductive coating and/or as a metallic ring.

19 Claims, 6 Drawing Sheets

Figure 1A:
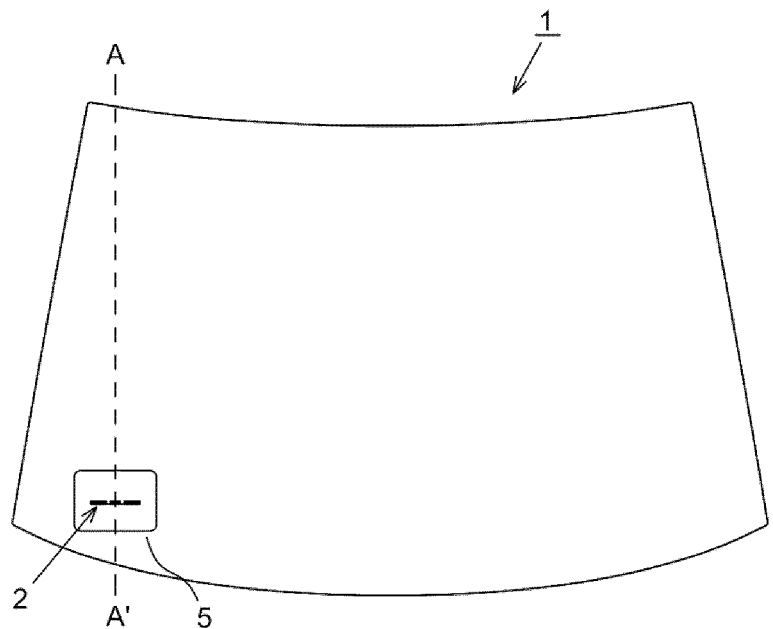

(58) Field of Classification Search
USPC .......................................................... 235/451
See application file for complete search history.

(56) References Cited

U.S. PATENT DOCUMENTS

| | | | |
|---|---|---|---|
| 6,320,509 | B1 | 11/2001 | Brady et al. |
| 2006/0092085 | A1* | 5/2006 | Hisaeda ................... H01Q 1/40 343/713 |
| 2012/0098715 | A1* | 4/2012 | Dai ...................... H01Q 1/1285 343/712 |
| 2020/0193259 | A1* | 6/2020 | Thangamani ............ G02B 1/10 |
| 2020/0259237 | A1* | 8/2020 | Shrivastava ............ G02F 1/163 |

FOREIGN PATENT DOCUMENTS

| | | | |
|---|---|---|---|
| CN | 109411864 A | * | 3/2019 |
| DE | 10 2010 039709 A1 | | 1/2012 |
| DE | 10 2016 013 938 A1 | | 5/2017 |
| JP | H04-326203 A | | 11/1992 |
| JP | H11-127012 A | | 5/1999 |
| JP | 2002-359565 A | | 12/2002 |
| JP | 2004-214820 A | | 7/2004 |
| JP | 2007-081554 A | | 3/2007 |
| JP | 2014-176077 A | | 9/2014 |
| RU | 2627233 C2 | | 8/2017 |
| WO | WO-0042678 A1 | * | 7/2000 ........... H01Q 1/1271 |
| WO | WO 2017/081052 A1 | | 5/2017 |

OTHER PUBLICATIONS

Singh, D., et al., "Frequency doubling active transponder in car windscreen," Electronics Letters, vol. 33, No. 21, Oct. 1997, XP006008059, pp. 1799-1800.

Notice of Reasons for Refusal as issued in Japanese Patent Application No. 2021-512379, dated May 6, 2022.

Communication under Article 94(3) EPU as issued in European Patent Application No. 19742057.3, dated May 9, 2022.

* cited by examiner

VEHICLE WINDOW HAVING A TRANSPONDER

CROSS-REFERENCE TO RELATED APPLICATIONS

This application is the U.S. National Stage of PCT/EP2019/069862, filed Jul. 24, 2019, which in turn claims priority to European patent application number 18192178.4 filed Sep. 3, 2018. The content of these applications are incorporated herein by reference in their entireties.

The invention relates to a vehicle window having a transponder, a method for its production, and the use of the vehicle window in means of transportation.

Transponders that are situated on objects, e.g., goods and merchandise, and that are read by readers with transmitting and receiving units are generally known. Such a transponder is used for identification of these objects and is usually part of an identification system. Such systems for identification consist, among other things, of a stationary reader and a mobile transponder attached to the object to be identified. Nowadays, the mobile transponder is an RFID (radio frequency identification) transponder consisting of an RFID chip and a separate antenna.

Reliability when reading an identification signal is of great importance, for example, in road traffic. The communication between the reader and the mobile transponder with the known radio-technology problems of unwanted reflection, absorption, and shielding often leads to inadequate reading results and writing results in the communication with the respective transponder. The known reading systems, which often have the form of a gate through which a vehicle to be registered and equipped with an RFID transponder drives have the disadvantage that the identification signal can sometimes not be detected due to the low signal strength.

DE 20 2016 013 938 A1 describes a vehicle device with an electronic identification and/or payment unit having an RFID unit. The RFID unit comprises a reading element and an output element. The reading element is arranged in a vehicle interior and detects the identification and/or payment information of an RFID chip. The identification and/or payment information detected is duplicated and copied into the output element. The output element is arranged on the outside of the vehicle and transmits the identification and/or payment information to an external reader without contact. Apart from the high outlay of electronic components required, the reading element must be installed on the outside of the vehicle and is not shielded against the environment such that undesirable interactions with the environment can occur.

The object of the invention is, consequently, to provide a vehicle window having a transponder that has increased communication quality.

The object was, consequently, successfully accomplished by a vehicle window in accordance with claim 1 and a vehicle in accordance with claim 13. Preferred embodiments of the invention are reflected in the dependent claims.

The invention thus relates to a vehicle window comprising a first glass pane and a transponder. The transponder has at least an antenna and a control unit for communicating with a reader, wherein the control unit includes a memory for storing identification data. The control unit is preferably a semiconductor chip that has the memory for storing identification data. Both the control unit with the memory and the antenna can be arranged on a substrate. The substrate can have a dielectric material that is bonded via an exterior-side surface of the substrate to a surface of the glass pane, preferably by gluing. The vehicle window has at least one reflector associated with the transponder, which is spaced apart from the transponder and is provided for increasing an antenna gain of the antenna, with the reflector being implemented as a transparent, electrically conductive coating and/or as a metallic ring. The specific position on or in the vehicle window follows from the term "associated reflector" in that it must, of course, be associated with the respective antenna position and must be adequately dimensioned to achieve an amplifying effect.

It is further intended for the transponder and the reflector to be arranged within the vehicle window.

In order to increase the antenna gain of a transponder on a vehicle window, the radiation is bundled. Via the reflector, the radiation of the antenna can be bundled such that an increased antenna gain results. The amplification of a signal transmitted and received by the transponder thus achieved can in particular be measured particularly well from a direction perpendicular to the surface of the vehicle window. The higher antenna gain increases the range and sensitivity of the transponder from a direction perpendicular to the surface of the vehicle window such that the transponder can be detected from a greater distance by a corresponding external reader. In the context of the present invention, "signal" means high-frequency electromagnetic radiation that is transmitted and/or received by the control unit via the antenna.

Advantageously, the vehicle window can be completed at the end of the production process or not until the subsequent site of use in that the transponder is attached at the location provided for this. The substrate can be very thin and transparent such that the transponder situated on the vehicle window is quite inconspicuous. The substrate is advantageously plate-like and has a constant material thickness (thickness).

According to a preferred further development of the invention, the reflector is implemented as a transparent, electrically conductive coating that has a region permeable to electromagnetic radiation in the frequency range of the antenna. This further development is based on the knowledge that many vehicle windows have transparent, electrically conductive coatings. These transparent, electrically conductive coatings have varied functionality. For example, they can be used as a heating device to free the vehicle window of moisture and ice, or are provided for reflecting thermal radiation.

The transparent, electrically conductive coating is preferably a functional coating, particularly preferably a functional coating with solar protection effect. A coating with solar protection effect has reflecting properties in the infrared range and thus in the solar radiation range. This advantageously reduces heating of the interior of a vehicle or building as a result of solar radiation. Such coatings are known to the person skilled in the art and typically contain at least one metal, in particular silver or a silver-containing alloy. The transparent, electrically conductive coating can include a sequence of multiple individual layers, in particular at least one metallic layer and dielectric layers, which contain, for example, at least one metal oxide. The metal oxide preferably contains zinc oxide, tin oxide, indium oxide, titanium oxide, silicon oxide, aluminum oxide, or the like as well as combinations of one or more thereof. The dielectric material can also contain silicon nitride, silicon carbide, or aluminum nitride.

This layer structure is generally obtained by a sequence of deposition operations that are carried out by a vacuum method such as magnetic field enhanced cathodic sputtering. Very fine metal layers, containing in particular titanium or niobium, can also be provided on both sides of the silver layer. The lower metal layer serves as an adhesion and crystallization layer. The upper metal layer serves as a protective and getter layer to prevent a change in the silver during the further process steps.

Particularly suitable transparent, electrically conductive coatings contain at least one metal, preferably silver, nickel, chromium, niobium, tin, titanium, copper, palladium, zinc, gold, cadmium, aluminum, silicon, tungsten, or alloys thereof, and/or at least one metal oxide layer, preferably tin-doped indium oxide (ITO), aluminum-doped zinc oxide (AZO), fluorine-doped tin oxide (FTO, $SnO_2$:F), antimony-doped tin oxide (ATO, $SnO_2$:Sb), and/or carbon nanotubes and/or optically transparent, electrically conductive polymers, preferably poly(3,4-ethylenedioxythiophenes), polystyrene sulfonate, poly(4,4-dioctyl-cylopentadithiophene), 2,3-dichloro-5,6-dicyano-1,4-benzoquinone, mixtures and/or copolymers thereof.

The thickness of the transparent, electrically conductive coating can vary widely and can be adapted to the requirements of the individual case. The transparent, electrically conductive coating preferably has a layer thickness of 10 nm to 5 μm and particularly preferably of 30 nm to 1 μm.

The sheet resistance of the transparent, electrically conductive coating is preferably from 0.35 ohm/square to 200 ohm/square, preferably 0.5 ohm/square to 200 ohm/square, most particularly preferably from 0.6 ohm/square to 30 ohm/square, and in particular from 2 ohm/square to 20 ohm/square. The transparent, electrically conductive coating can, in principle, have even lower sheet resistances than 0.35 ohm/square, in particular when only low light transmittance is necessary when it is used. The transparent, electrically conductive coating preferably has good infrared reflecting properties and/or particularly low emissivities (low-E).

Common to the transparent, electrically conductive coatings is the fact that they are also impermeable to electromagnetic radiation in the high frequency range. Glazing a vehicle on all sides and all surfaces with transparent, electrically conductive coatings renders transmission and reception of electromagnetic radiation in the interior virtually impossible. For the operation of sensors such as rain sensors, camera systems, or stationary antennas, one or two locally limited regions of the electrically conductive, transparent coating are usually decoated. These decoated regions form a so-called communication window or data transmission window. Such communication windows are arranged at inconspicuous positions on the pane, for example, in the region of the inside mirror of a windshield, and are masked by black prints and plastic panels.

The transparent, electrically conductive coating is implemented suitable for use as a reflector and can extend at least over part of a surface of the glass pane or be integrated into an intermediate layer running parallel thereto.

The transponder or the surface of the orthogonal projection of the transponder are arranged in the region of the transparent, electrically conductive coating permeable to electromagnetic radiation in the frequency range of the antenna, in particular a communication window. In other words, the region of the transparent, electrically conductive coating permeable to electromagnetic radiation in the frequency range the antenna overlaps the transponder in a perpendicular orientation relative to the first glass pane.

The region permeable to electromagnetic radiation consists, depending on the frequency, of only a radius of a few centimeters around the transponder. In this advantageous further development, an additional production step is omitted, since an already present transparent, electrically conductive coating can be used as a reflector.

The region permeable to electromagnetic radiation in the frequency range of the antenna can be implemented as a coating-free region. The coating-free region electrically isolates the transponder from the rest of the transparent, electrically conductive coating against direct currents. The coating-free region is a region in which the transparent, electrically conductive coating has been removed, for example, by laser ablation or abrasive processes. This is particularly easy and economical to carry out industrially.

Alternatively, the region permeable to electromagnetic radiation in the frequency range of the antenna is formed by means of laser cuts, wherein the coating is not full-surface but has, instead, a rectangular grid, a diamond grid, or a grid with any shapes. The grid consists of multiple surface elements, isolated from one another and having, in each case, compared to the wavelength, a small extension or edge length of less than one tenth of the wavelength. The maximum extension, in particular, the edge length, can, for example, be from 1 mm to 0.1 mm.

If the transparent, electrically conductive coating and the transponder are arranged in one plane, e.g., if the transponder is arranged on the surface of the pane on which the transparent, electrically conductive coating also extends, the transparent, electrically conductive coating can enclose the transponder.

In another expedient further development of the invention, the reflector can include a line conductor. The line conductor can be implemented as a printed, electrically conductive paste, preferably a silver-containing screen printing paste or as an electrically conductive conductor, preferably made of metal and, in particular, of copper, silver, gold, or aluminum.

Copper has proved itself for such conductors, since it has good electrical conductivity. At the same time, the material costs are low with copper.

The line conductor serves as a reflector for reflecting electromagnetic waves and is suitably designed for this purpose, i.e., it has a suitable length for reflection in the desired frequency range. The line conductor can also be implemented, for example, as a wire or a flat conductor. A line conductor as a reflector is stable to handle and is stably attached to the vehicle window during storage.

According to an advantageous further development of the invention, the reflector includes two line conductors, which are, in each case, arranged at the same distance from the transponder. This makes possible a transponder with a reflector arrangement that is particularly easy to produce.

According to another advantageous further development of the invention, the reflector can be implemented as a metallic closed ring. This has the advantage that the reflection can be strengthened additionally depending on the transponder type.

According to an advantageous further development of the invention, operation of the transponder is energy self-sufficient.

According to another advantageous further development of the invention, the transponder is an RFID transponder. In particular, UHF RFID transponders have a semiconductor chip, which is characterized by small dimensions relative to the antenna.

In another embodiment of the invention, the transponder operates in a frequency range from 800 MHz to 3 GHz, preferably to 2.45 GHz, particularly preferably from 860

MHz to 930 MHz. The dimensions of the antenna generally depend on the desired frequency band and the respective application.

It is further proposed that the identification data be provided for identification of a vehicle. Thus, the assignment of a transponder to a vehicle can be advantageously achieved.

According to another advantageous further development of the invention, the first glass pane is joined to a second glass pane via a thermoplastic intermediate layer. Basically, all electrically insulating substrates that are thermally, chemically, and dimensionally stable under the conditions of the production and use of the vehicle window according to the invention are suitable as the glass pane. The transponder is preferably attached on an interior-side surface of the first glass pane.

Alternatively, the transponder and/or the reflector can be arranged between the first and the second glass pane in the intermediate layer.

In another advantageous embodiment of the vehicle window according to the invention, the transparent, electrically conductive coating is situated on at least one of the surfaces, in particular an inner surface, of the first and/or second glass pane. Alternatively, the transparent, electrically conductive coating can be integrated in the intermediate layer. The transparent, electrically conductive coating is then preferably applied on a carrier film. The carrier film preferably contains a polymer, in particular polyvinyl butyral (PVB), ethylene vinyl acetate (EVA), polyurethane (PU), polyethylene terephthalate (PET), or combinations thereof.

The first and/or second glass pane preferably contain glass, particularly preferably flat glass, float glass, quartz glass, borosilicate glass, soda lime glass, or clear plastics, preferably rigid clear plastics, in particular polyethylene, polypropylene, polycarbonate, polymethyl methacrylate, polystyrene, polyamide, polyester, polyvinyl chloride, and/or mixtures thereof. The first and/or the second glass pane are preferably transparent, in particular for use in a vehicle, for example, as a windshield or rear window, or other applications in which high light transmittance is desired. In the context of the invention, "transparent" means a pane that has transmittance of more than 70% in the visible spectral range. For vehicle panes that are not in the traffic-relevant field of vision of the driver, for example, for roof panels, the transmittance can, however, also be much lower, for example, greater than or equal to 5%.

In a vehicle window, the first glass pane and the second glass pane are joined to one another by at least one intermediate layer. The intermediate layer is preferably transparent. The intermediate layer preferably contains at least one plastic, preferably polyvinyl butyral (PVB), ethylene vinyl acetate (EVA), and/or polyethylene terephthalate (PET). The intermediate layer can, however, also contain, for example, polyurethane (PU), polypropylene (PP), polyacrylate, polyethylene (PE), polycarbonate (PC), polymethyl methacrylate, polyvinyl chloride, polyacetate resin, casting resins, acrylates, fluorinated ethylene-propylene, polyvinyl fluoride, and/or ethylene tetrafluoroethylene, or copolymers or mixtures thereof. The intermediate layer can be formed by one or even a plurality of films arranged one over the other or next to one another, wherein the thickness of a film is preferably from 0.025 mm to 1 mm, typically 0.38 mm or 0.76 mm. The intermediate layers can preferably be thermoplastic, and, after lamination, can bond the first glass pane and the second glass pane and any other intermediate layers to one another.

The lamination, i.e., the joining of the first glass pane and the second glass pane via the intermediate layer, is preferably done under the action of heat, vacuum, and/or pressure. Methods known per se can be used for producing a laminated pane.

In another expedient further development, the vehicle window additionally has a circumferential frame-shaped decoated region with a width of 2 mm to 20 mm, preferably of 5 mm to 10 mm. This serves as electrical insulation between the voltage carrying coating and the vehicle body. The circumferential frame-shaped decoated region is preferably hermetically sealed by the intermediate layer or an acrylate adhesive as a vapor diffusion barrier. The corrosion sensitive coating is protected against moisture and atmospheric oxygen by the vapor diffusion barrier. In addition, the transparent, electrically conductive coating can be decoated in another region that serves, for example, as a data transmission window or a communication window. The transparent pane is permeable to electromagnetic and, in particular, infrared radiation in the further decoated region.

The vehicle window according to the invention is suitable for separating the interior of a vehicle from an external environment. The reader of the transponder that can receive signals from the transponder is situated in the external environment (in short, outside space).

The thickness of the first and/or second glass pane can vary widely and thus be ideally adapted to the requirements of the individual case. Preferably, standard thicknesses from 1.0 mm to 25 mm, preferably from 1.4 mm to 2.5 mm, are used for vehicle glass. The size of the first glass pane and/or of the second glass pane can vary widely and is governed by the size of the application according to the invention. The first glass pane and/or the second glass pane have, for example, areas from 200 $cm^2$ up to 3 $m^2$ customary in vehicle construction.

The vehicle window can have any three-dimensional shape. Preferably, the three-dimensional shape has no shadow zones such that it can be coated, for example, by cathodic sputtering. Preferably, the first glass pane and the second glass pane are planar or slightly or strongly curved in one or more spatial directions. Planar panes are used in particular. The panes can be colorless or colored.

In addition, the vehicle window can have a conductor system with a heating function, which comprises resistance elements arranged between current-carrying busbars and serving as heating conductors. The heating conductors are made of vertical resistance wires running essentially parallel to one another that have a diameter of roughly 20 μm to 200 μm, preferably 0.09 mm (90 μm). They are preferably positioned wavelike and mutually spaced at a distance of roughly 1 mm to 5 mm and run essentially perpendicular to the intent of the transponder.

The vehicle window according to the invention is suitable for all vehicles, e.g., motor vehicles, trains, watercraft, or aircraft, with motor vehicles particularly preferred. Examples of suitable motor vehicles are buses, tractors, trucks, and passenger cars, with passenger cars particularly preferred.

In a preferred embodiment, the vehicle window is a windshield, a roof panel, a rear window, a rear side window, or a front side window, preferably in a motor vehicle.

The combination of technical features described according to the invention results in a vehicle window in which the antenna gain of the transponder is optimized.

Another aspect of the invention comprises a method for producing a vehicle window, wherein at least:

the transponder having the antenna and the control unit for communicating with a reader is attached to a surface of the first glass pane, to a surface of a second glass pane, or between the first and the second glass pane, wherein the control unit has a memory for storing identification data, and the reflector associated with and spaced apart from the transponder for increasing an antenna gain of the antenna is mounted on a surface of the first glass pane, a surface of the second glass pane, or between the first and the second glass pane.

In an advantageous embodiment of the method according to the invention, the transponder is arranged on a substrate, wherein the substrate is bonded to the surface of the glass pane with an adhesive.

The invention also includes the use of the vehicle window according to the invention in means of transportation for travel on land, in the air, or on water, in particular in motor vehicles, for example, as a windshield, side window, rear window, and/or roof panel.

The invention also relates to a vehicle including at least one vehicle window according to the invention, wherein the vehicle is preferably a motor vehicle.

The invention is further explained in the following using nonrestrictive exemplary embodiments with reference to the accompanying drawings.

Figure 1B:
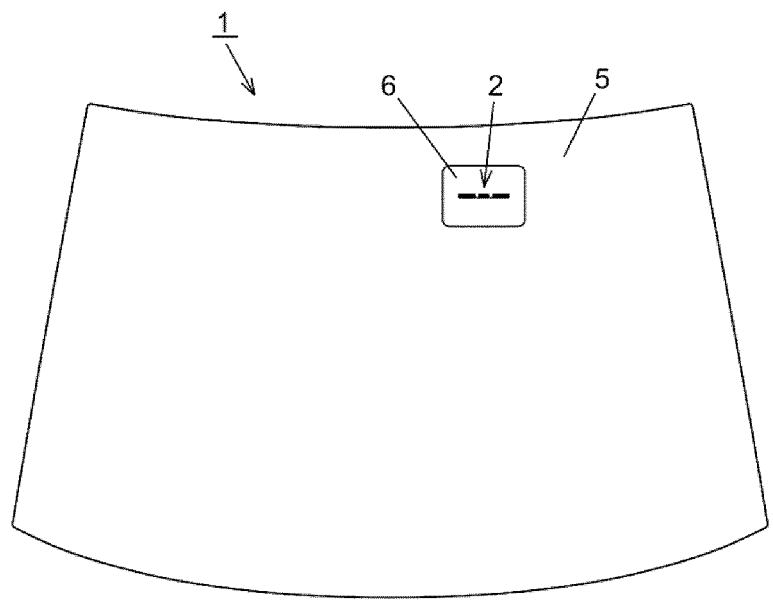
Figure 2:
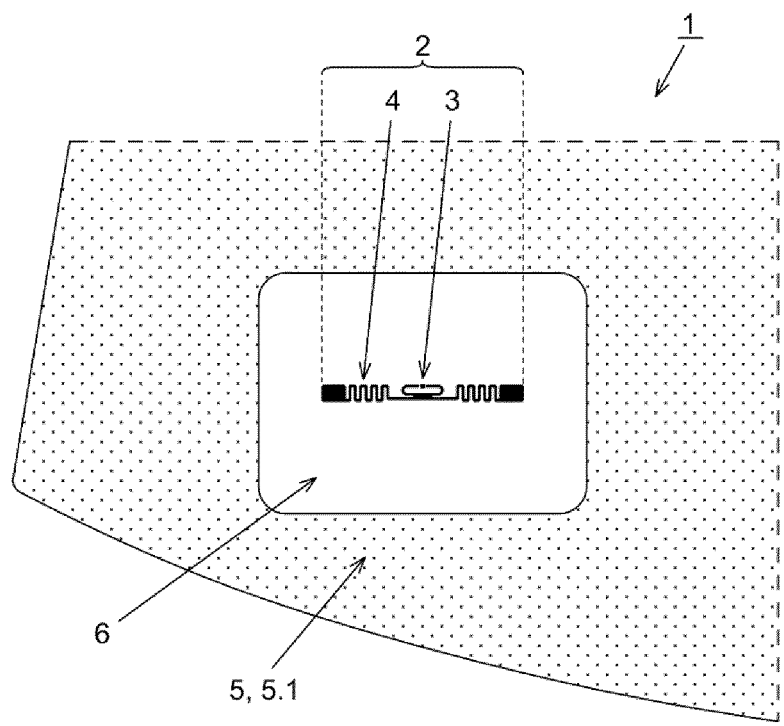
Figure 3:
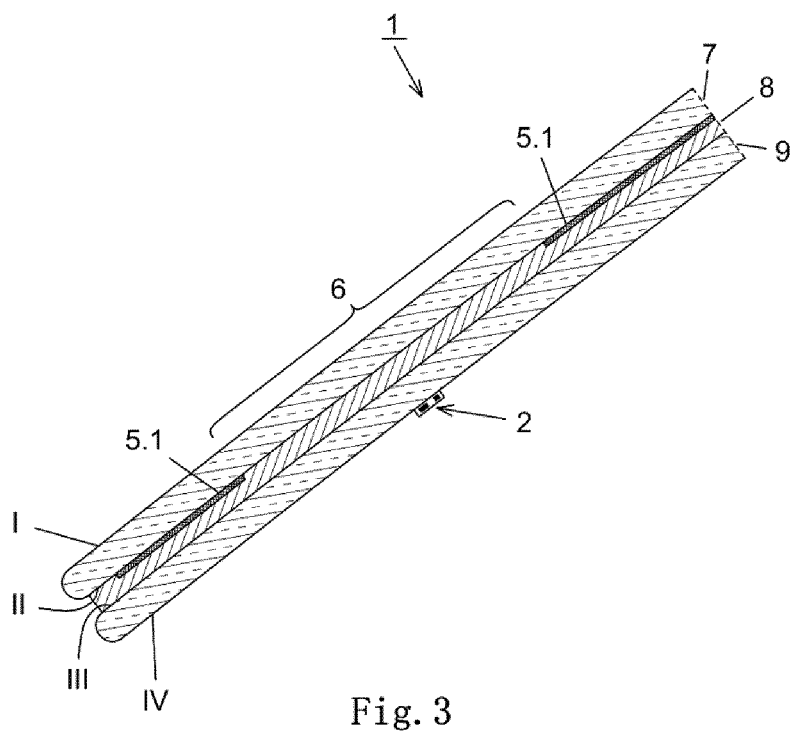
Figure 4:
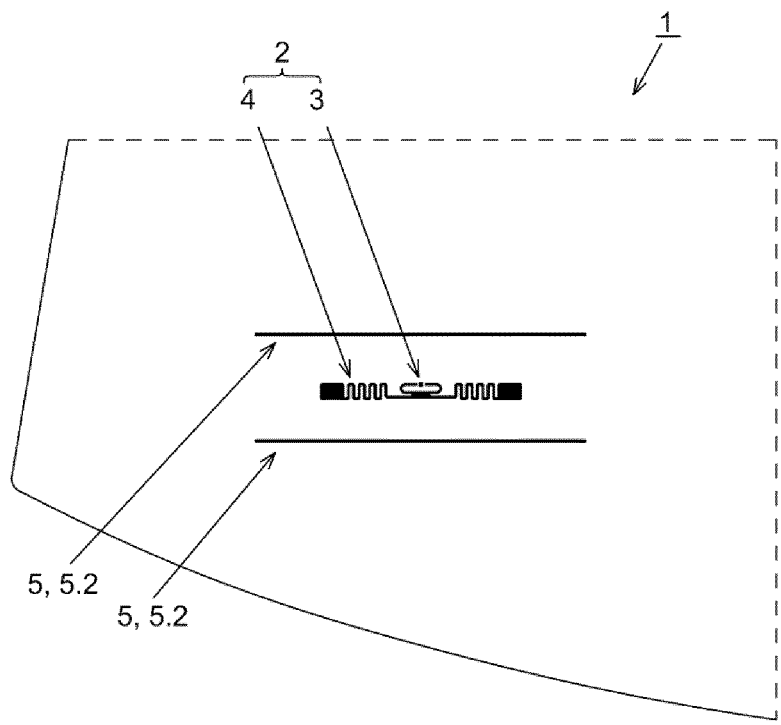
Figure 5:
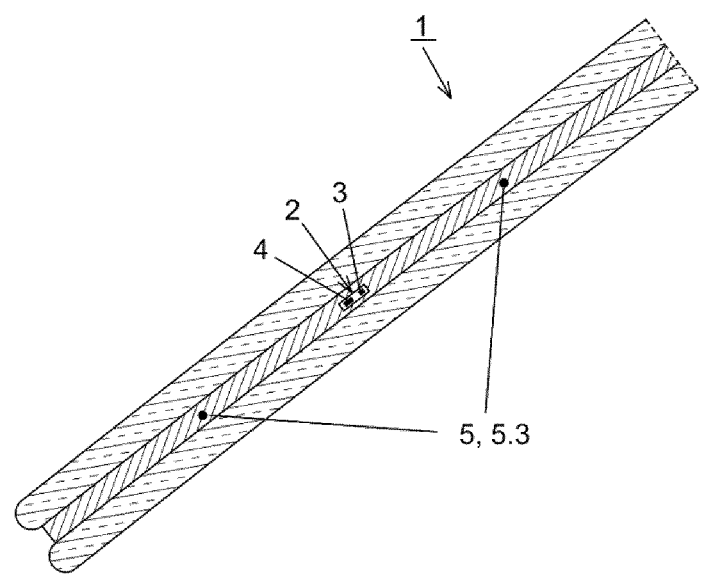
Figure 6A:
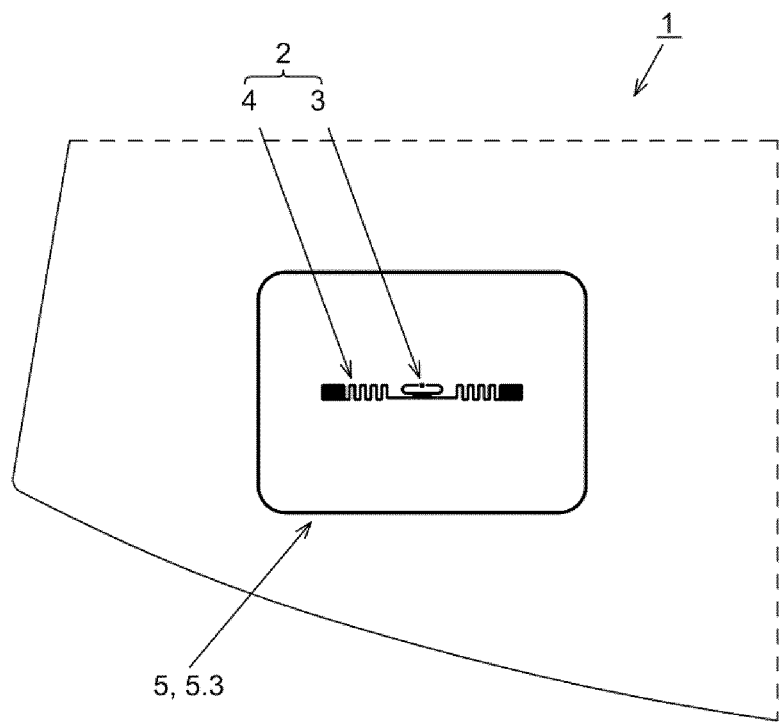
Figure 6B:
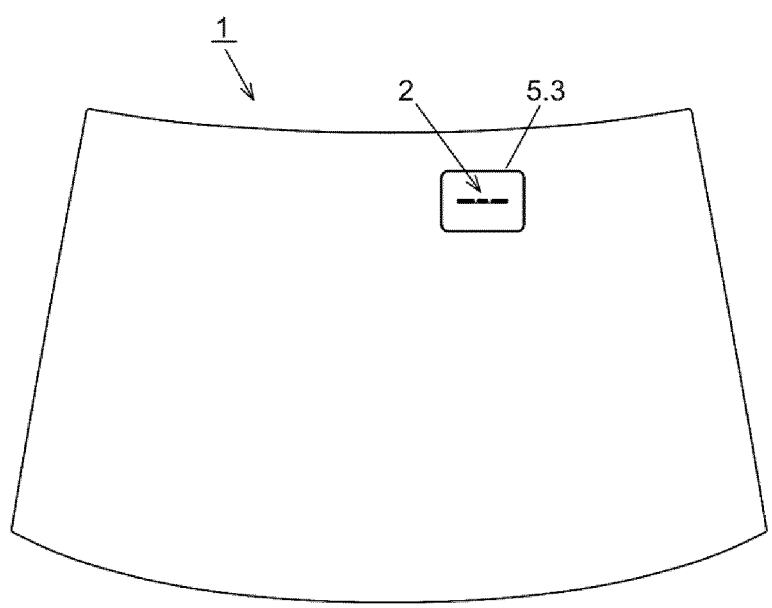
Figure 7:
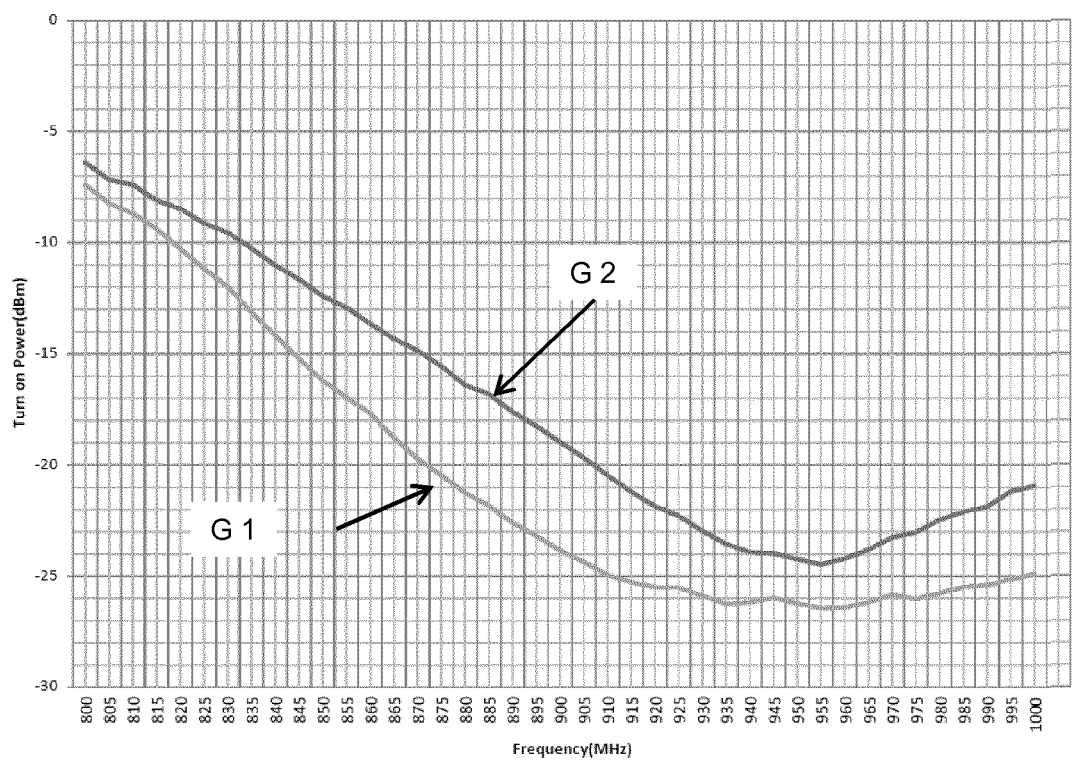
Figure 8:
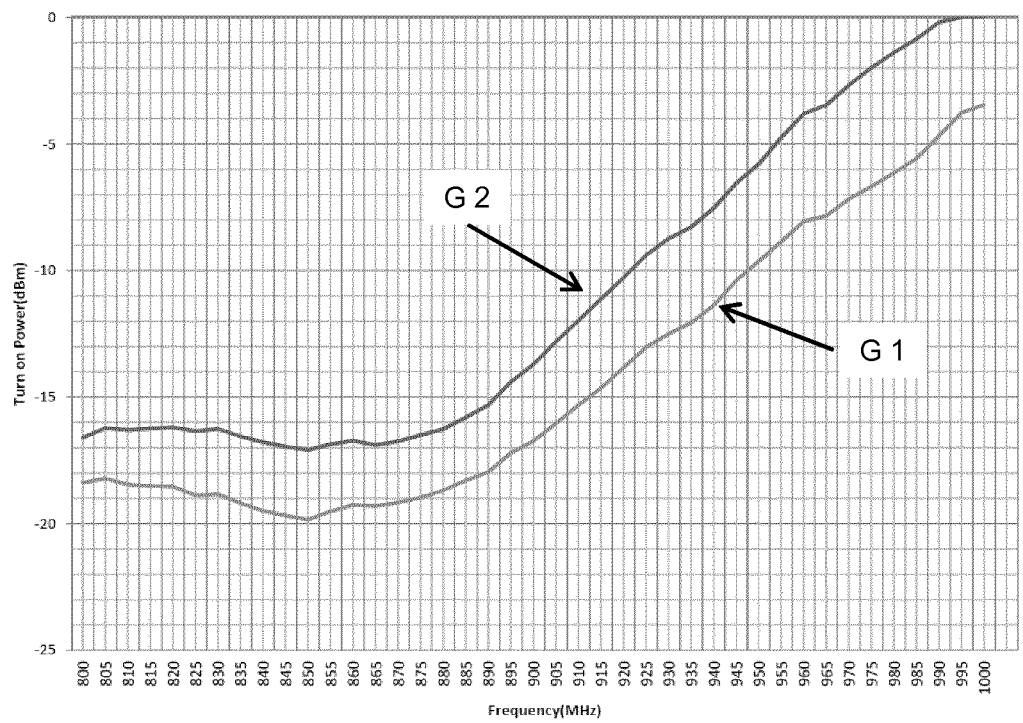

The invention is explained in the following and in the accompanying figures. The drawings are not completely to scale. The invention is in no way restricted by the drawings. They depict:

FIG. 1a a plan view of a vehicle window according to the invention having a transponder;

FIG. 1b a plan view of a alternative vehicle window according to the invention having a transponder;

FIG. 2 an enlarged representation of a detail of FIG. 1 having a transponder;

FIG. 3 a cross-section along the section line A-A' of FIG. 2;

FIG. 4 an exemplary embodiment of a vehicle window according to the invention having a transponder, FIG. 5 a cross-sectional representation of the vehicle window of FIG. 4, FIG. 6a another exemplary embodiment of a vehicle window according to the invention having a transponder, FIG. 6b a plan view of another vehicle window according to the invention having a transponder, FIG. 7 an exemplary performance diagram of a signal received by the transponder according to the invention, and FIG. 8 another exemplary performance diagram of a signal received by the transponder according to the invention.

In the following, the invention will be presented in more detail with reference to the figures. It should be noted that various aspects that can be used individually or in combination. In other words, any aspect can be used with different embodiments of the invention unless explicitly presented as a pure alternative.

Furthermore, for the sake of simplicity, in the following, reference is usually always made to only one entity. However, if not explicitly noted, the invention can in each case also have a plurality of the entities in question. Thus, the use of the words "a" and "an" are to be understood only as an indication that in a simple embodiment, at least one entity is used.

Data with numerical values are usually not to be construed as exact values, but also contain a tolerance from +/−1% up to +/−10%.

FIG. 1a depicts a plan view of a vehicle window 1 according to the invention. In this example, the vehicle window 1 is implemented as a windshield of a passenger car and equipped with a transponder 2. The dimensions of the vehicle window 1 are, for example, 0.9 m×1.5 m. The transponder 2 is arranged in the lower, lateral region of the vehicle window 1. Alternatively, the transponder 2 can be arranged at other locations of the vehicle window 1, for example, in the upper, central region of the vehicle window 1. It is important to find a suitable position with a good connection to the reader.

The transponder 2 is a so-called "UHF RFID transponder" (data carrier for radiofrequency identification) having an antenna 4 and a control unit 3 with a memory for storing identification data and for communicating with an external reader (cf. FIG. 2). This transponder 2 transmits an individualizing signal when exposed to a corresponding electromagnetic alternating field. In other words, the electromagnetic alternating field must be modulated with an interrogation signal. To read the transponder 2, the electromagnetic alternating field tuned to the transponder 2 is generated by an external reader. Such transponders operate in the frequency range from 860 MHz to 930 MHz, the so-called "ultra high frequencies" (UHF). Accordingly, the size of the antenna 4 is matched to these frequencies.

The transponder 2 can be implemented as an active or passive transponder. The active transponder 2 can receive the energy for the signal transmitted by the transponder from a separate energy source associated with the transponder 2. The passive transponder 2 draws the energy for the transmission of individualizing signals from the energy of the electromagnetic alternating field generated by the reader. After the transponder 2 has transmitted the signal, the signal is received by the external reader within the range of the signal.

FIG. 1b depicts a plan view of a alternative embodiment of the vehicle window 1 of FIG. 1. In contrast to FIG. 1, the transponder 2 is arranged in the upper region of the vehicle window 1. This arrangement is particularly advantageous when the transponder 2 is situated within range of an alternating field generated by a reader and the reader is arranged above the vehicle.

FIG. 2 depicts an enlarged representation of a detail of the vehicle window 1 according to the invention of FIG. 1. The vehicle window 1 includes the transponder 2 and, here, for example, a transparent, electrically conductive coating 5.1 as a reflector 5 for increasing the antenna gain. The transparent, electrically conductive coating 5.1 has a coating-free region 6. The coating-free region 6 is rectangular with a length of 130 mm and a width of 110 mm. The coating-free region 6 of the transparent, electrically conductive coating 5.1 overlaps the transponder 2 in a perpendicular orientation relative to the vehicle window 1. The transponder 2 is arranged substantially centrally in the coating-free region 6. Thus, the radiation is reflected via the transparent, electrically conductive coating 5.2. The bundling of the radiation results in an amplified antenna signal.

The length and width of the coating-free region 6 are matched to the frequency range of the antenna 4. The antenna 4 can be a flat antenna that has a symmetrical, meander-shaped structure.

Alternatively, the region 6 that is transparent to electromagnetic radiation in the frequency range of the antenna is formed by laser cuts. The transparent, electrically conductive coating 5.1 is, in that case, not completely removed in the region 6, but has a rectangular grid. The rectangular grid consists of multiple rectangular elements that are insulated from one another and that have, in each case, an edge length of less than one tenth of the wavelength of the electromagnetic radiation. The edge length can be, for example, from 1 mm to 0.5 mm, with the rectangles having a width of 0.1 mm.

FIG. 3 depicts, schematically, a vehicle window according to the invention in cross-section with the first, outer glass pane 7, an intermediate layer 8, and a second, inner glass pane 9. The intermediate layer 8 is a PVB film. In addition, further intermediate layers can be arranged between the first glass pane 7 and the second glass pane 9. The intermediate layers can include polyvinyl butyral, ethylene vinyl acetate, polyurethane, and/or mixtures and/or copolymers thereof and a polymer film. Preferably, a layer of polyvinyl butyral (PVB) with a polyethylene terephthalate film (PET) is used. Such intermediate layers can have infrared-reflecting properties.

The second, inner glass pane 9 is, for example, intended to face the interior of the vehicle in the installed position. In other words, it has an interior-side surface IV that is accessible from the interior, whereas the exterior-side surface I of the first, outer glass pane 7 faces outward relative to the vehicle interior. The first, outer glass pane 7 and the second, inner glass pane 9 are made, for example, of soda lime glass. The thickness of the second, inner glass pane 9 is, for example, 1.6 mm; and the thickness of the first, outer glass pane 7 is 2.1 mm. It goes without saying that the first, inner glass pane 7 and the second, outer glass pane 9, for example, can also have the same thickness. The intermediate layer 8 has a thickness of 0.76 mm.

The transponder 2 is arranged on the interior-side surface IV of the second, inner glass pane 9. The transponder 2 is situated in a region of the vehicle window 1, in which a coating-free region 6 is arranged on the interior-side surface II of the first, outer glass pane 7. The coating-free region 6 is thus positioned opposite the transponder 2. The coating-free region 6 is permeable to electromagnetic radiation in the frequency range of the antenna 4 such that the signal emitted by the antenna 4 penetrates the second, inner glass pane 9 and the coating-free region 6 from the vehicle interior in the direction of the vehicle exterior.

FIG. 4 depicts an alternative exemplary embodiment of a vehicle window 1 according to the invention of FIG. 2. The transponder 2 is arranged in the intermediate layer 8 of the vehicle window 1. In contrast to FIG. 2, the reflector 5 associated with the transponder 2 is implemented as an arrangement of two line conductors 5.2. The transponder 2 is integrated in the intermediate layer 8 between the two line conductors 5.2. The line conductors 5.2 are arranged, in each case, at the same distance from the transponder 2 such that the transponder 2 is positioned centrally between the two line conductors 5.2. These line conductor 5.2 are electrical conductors made of metal wires. The length of a line conductor 5.2 is determined by the frequency of the alternating field used and is approx. half a wavelength shortened by the medium (Lambda/2*n). With an operating frequency of 860 MHz for the transponder, the line conductors 5.2 have in each case a length of 16 cm.

Alternatively, or additionally, the transponder 2 and/or the line conductors 5.2 can be arranged on the interior-side surface IV of the second, inner glass pane 9. The line conductors 5.2 are then made of a silver-containing screen printing paste that is applied on the vehicle window by burning in or printing. The layer thickness of the burned-in silver paste is preferably from 5 μm to 20 μm.

FIG. 5 depicts a cross-sectional representation of the vehicle window of FIG. 4. In contrast to FIG. 2, the transponder 2 and the reflector 5 associated with the transponder 2 are arranged between the first, outer glass pane 7 and the second, inner glass pane 9. The reflector 5 consists of two line conductors 5.2 that are arranged at the same distance from the transponder 2.

FIG. 6a depicts an alternative exemplary embodiment of a vehicle window 1 according to the invention of FIG. 4. In contrast to FIG. 4, the transponder 2 and the reflector 5 are arranged on the interior-side surface IV of the second, inner glass pane 9. The reflector 5 is implemented as a metallic, closed ring 5.3. The metallic, closed ring is an electrical conductor made of silver-containing screen printing paste that is applied on the vehicle window 1 by burning in or printing.

FIG. 6b depicts a plan view of a alternative embodiment of the vehicle window 1 of FIG. 6. In contrast to FIG. 6, the transponder 2 and the reflector 5.3 are arranged in the upper region of the vehicle window 1.

FIG. 7 depicts an exemplary performance diagram of a transponder 2 per FIG. 2. A signal, a so-called "forward signal", was sent by the external reader and received by the transponder 2 with a reflector 5.1 associated with and spaced apart from the transponder 2. The signal power was recorded at the transponder 2 and displayed as Graph G1. A reference power was measured as Graph G2, using a transponder without a reflector. It can be clearly seen that the transponder 2 with a reflector requires a lower signal power to receive the forward signal. The antenna gain is increased thereby.

FIG. 8 depicts an exemplary performance diagram of a transponder 2 per FIG. 4. A signal, a so-called "forward signal", was sent by the external reader and received by the transponder 2 with a reflector 5.2 associated with and spaced apart from the transponder 2. The signal power was recorded at the transponder 2 and displayed as Graph G1. A reference power was measured as Graph G2, using a transponder without a reflector. Here again, it can be clearly seen that the transponder 2 with a reflector requires lower signal power to receive the forward signal. The antenna gain is increased thereby.

The invention makes available a vehicle window 1, in which the signal of the transponder 2 is amplified in a direction perpendicular to the surface of the vehicle window. In an advantageous embodiment of the invention, an increased antenna gain of the antenna 4 is achieved by a corresponding embodiment of the transparent, electrically conductive coating 5.1 as a reflector 5 with the coating-free region 6 and a spaced arrangement of the transponder 2 with an antenna 4. This was unexpected and surprising for the person skilled in the art.

LIST OF REFERENCE CHARACTERS 1 vehicle window
2 transponder
3 control unit
4 antenna
5 reflector
5.1 transparent, electrical coating
5.2 line conductor
5.3 ring
6 region permeable to electromagnetic radiation in the frequency range of the antenna
7 first, outer glass pane
8 intermediate layer
8 second, inner glass pane
I exterior-side surface of the first, outer glass pane 7
II interior-side surface of the first, outer glass pane 7

III exterior-side surface of the second, inner glass pane 9
IV interior-side surface of the second, inner glass pane 9

The invention claimed is:

1. Vehicle window, comprising:
   a) a first glass pane,
   b) a transponder having an antenna and a control unit for communicating with a reader, wherein the control unit includes a memory for storing identification data,
   the vehicle window further comprising a reflector associated with and spaced apart from the transponder for increasing an antenna gain of the antenna, wherein the reflector is implemented as a transparent, electrically conductive coating and/or as a metallic ring,
   wherein the transparent, electrically conductive coating has a region permeable to electromagnetic radiation in the frequency range of the antenna, and wherein the transponder or a surface of an orthogonal projection of the transponder is entirely arranged in a region permeable to electromagnetic radiation in the frequency range of the antenna.

2. The vehicle window according to claim 1, wherein the reflector has at least one line conductor.

3. The vehicle window according to claim 1, wherein the reflector has two line conductors, which are in each case arranged at the same distance from the transponder.

4. The vehicle window according to claim 1, wherein the reflector is implemented as a closed ring.

5. The vehicle window according to claim 1, wherein the operation of the transponder is energy self-sufficient.

6. The vehicle window according to claim 1, wherein the transponder is an RFID transponder.

7. The vehicle window according to claim 1, wherein the transponder operates in a frequency range from 800 MHz to 3 GHz.

8. The vehicle window according to claim 1, wherein die identification data are provided for identification of a vehicle.

9. The vehicle window according to claim 1, wherein the first glass pane is joined to a second glass pane via a thermoplastic intermediate layer.

10. The vehicle window according to claim 1, wherein the vehicle window is a motor vehicle window.

11. Vehicle, including a vehicle window according to claim 1.

12. Method for producing a vehicle window according to claim 1, the method comprising:
   a) attaching the transponder having the control unit for communicating with a reader to a surface of the first glass pane, to a surface of a second glass pane or between the first and the second glass pane, wherein the control unit has a memory for storing identification data and the antenna, and
   b) arranging the reflector associated with and spaced apart from the transponder for increasing an antenna gain of the antenna on a surface of the first glass pane, on a surface of the second glass pane, or between the first and the second glass pane.

13. A method comprising utilizing the vehicle window according to claim 1 in a vehicle of transportation for travel on land, in the air, or on water.

14. The vehicle window according to claim 7, wherein the frequency range is from 800 MHz to 2.45 GHz.

15. The vehicle window according to claim 14, wherein the frequency range is from 860 MHz to 930 MHz.

16. The vehicle according to claim 11, wherein the vehicle is a motor vehicle.

17. The method according to claim 13, wherein the vehicle is motor vehicle.

18. The method according to claim 13, wherein the vehicle window is a windshield, rear window, and/or roof panel.

19. The vehicle window according to claim 1, wherein the transponder is positioned substantially centrally in the region permeable to electromagnetic radiation.

\* \* \* \* \*